United States Patent [19]
Sutton, Jr.

[11] 3,915,377
[45] Oct. 28, 1975

[54] CURTAIN CONTROL DEVICE FOR POULTRY OR LIVESTOCK HOUSE

[76] Inventor: James Alton Sutton, Jr., 866 Henkel Road, Statesville, N.C. 28677

[22] Filed: Feb. 11, 1974

[21] Appl. No.: 441,498

[52] U.S. Cl. .......................... 236/49; 119/21; 49/2; 160/1; 160/9; 98/33 R
[51] Int. Cl.² .......................................... F24F 13/08
[58] Field of Search .......... 236/49; 98/33 R, 39, 37, 98/86, 1; 119/21; 49/2, 3, 31, 7; 160/1, 9

[56] References Cited
UNITED STATES PATENTS

| | | | |
|---|---|---|---|
| 2,456,489 | 12/1948 | Burkholder, Jr. | 236/49 X |
| 3,042,001 | 7/1962 | Dubie et al. | 119/21 |
| 3,429,298 | 2/1969 | Thomason | 119/21 |
| 3,474,761 | 10/1969 | Thomason | 119/21 |
| 3,511,299 | 5/1970 | Newell et al. | 160/1 |
| 3,571,973 | 3/1971 | Roberts | 160/6 X |
| 3,665,996 | 5/1972 | Roberts | 160/1 |
| 3,669,350 | 6/1972 | White | 236/49 |
| 3,706,271 | 12/1972 | Mielzkowski | 98/41 R |
| 3,741,101 | 6/1973 | Sheppard | 98/86 |

Primary Examiner—William E. Wayner
Assistant Examiner—William E. Tapolcai, Jr.
Attorney, Agent, or Firm—Parrott, Bell, Seltzer, Park & Gibson

[57] ABSTRACT

A curtain control device is provided for use with a poultry or livestock house having an electrically operated forced ventilation system and/or having adjustable curtains along the side walls thereof adapted for being raised and lowered for providing adequate ventilation in the poultry house. The device is operably connected to the curtains and adapted for automatically opening the curtains of the poultry house in response to a failure of the electrical power operating the ventilating system for thereby insuring ventilation of the poultry house and preventing suffocation of the poultry housed therein. The device is also adapted for effecting lowering of the curtains in the event the temperature within the poultry house exceeds a predetermined level.

16 Claims, 5 Drawing Figures

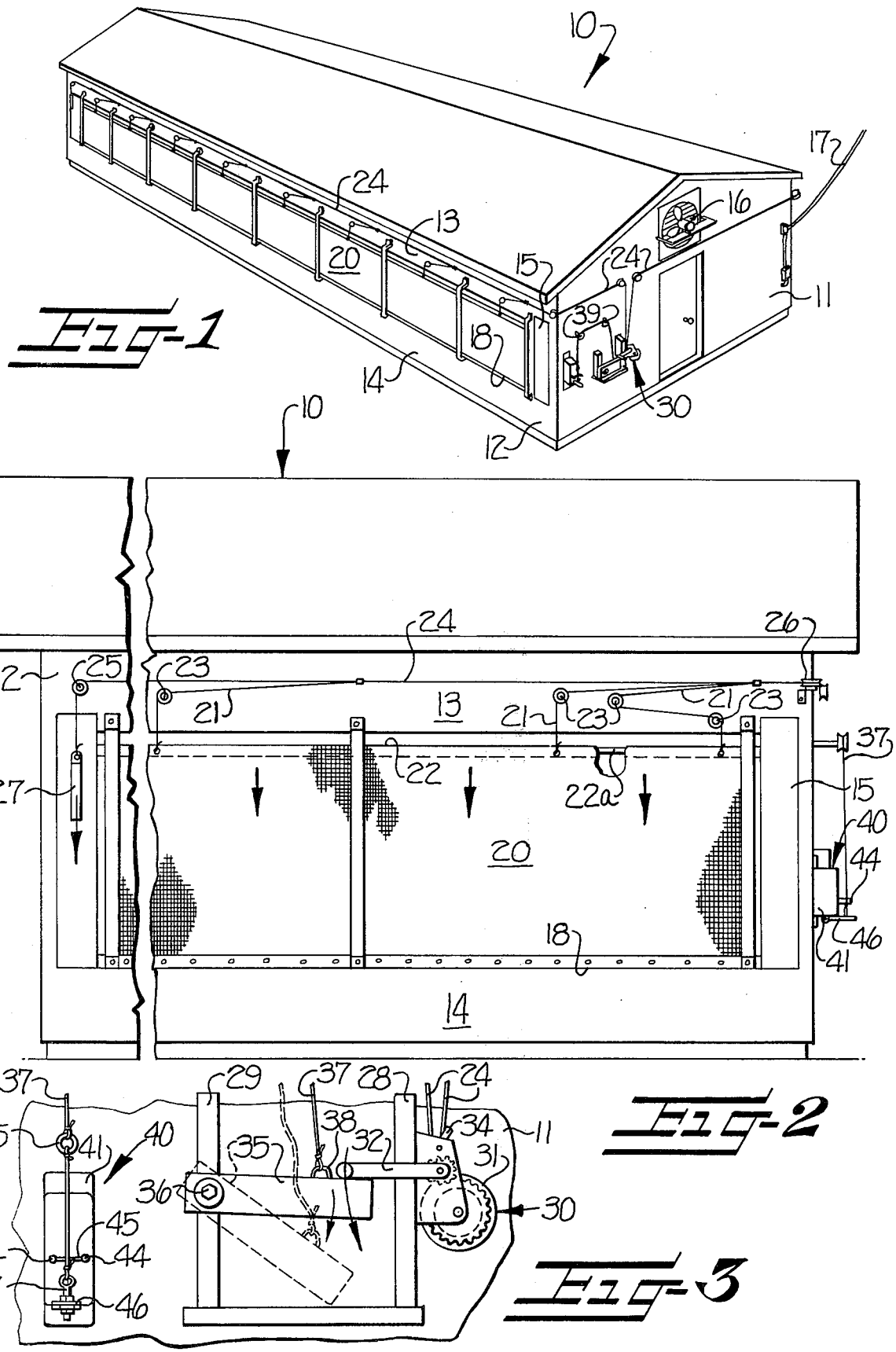

CURTAIN CONTROL DEVICE FOR POULTRY OR LIVESTOCK HOUSE

Houses of the type employed for raising poultry or livestock such as swine conventionally have large open screened areas in the walls thereof with curtains being provided thereacross and adapted for being manually opened for obtaining adequate ventilation of the house, as required. Additionally, in many houses, electrically operated forced ventilating means such as fans are employed to effect ventilation of the house and to facilitate maintaining the temperature therein at a desired level.

Heretofore, it has been necessary for the farmer to pay constant attention to the houses and to manually open the curtains thereof when additional ventilation in the house is needed so as to avoid unhealthy temperature conditions within the house. In houses having forced ventilation systems a power or mechanical failure may result in the temperature within the house rising rapidly, due to the large amount of heat generated by the poultry or livestock in the house. In such event, it is possible that the poultry or livestock may be injured or killed before the farmer ever becomes aware of the failure of the ventilation system.

While devices have been provided for automatically raising and lowering the curtains of houses of this type in response to temperature variations within the house, these devices employ motors which require external power both for for raising and for lowering the curtains. Thus, a power or mechanical failure of such devices when the curtains are raised may also result in injuring or killing the poultry or livestock in the house.

With the foregoing in mind, it is an object of the present invention to provide a simple and inexpensive device for use with a poultry or livestock house for insuring adequate ventilation thereof in the event of a failure of the ventilation system or of an abnormally high temperature condition within the house to thereby prevent suffocation or injury to the poultry or livestock in the house.

It is a more specific object of the invention to provide a simple and inexpensive self-powered device for releasing the raised or partially raised curtains of a poultry or livestock house in the event of a power failure or abnormally high temperature condition within the house to thereby allow the curtains to be lowered to an open position by their own weight and to insure adequate ventilation of the house and prevent suffocation of the poultry or livestock housed therein.

The above objects have been accomplished in accordance with the present invention by means of a simple and inexpensive curtain control device which is adapted for use on most conventional poultry or livestock houses for effecting lowering of the curtains thereof automatically when a power failure occurs or when the temperature within the house exceeds a desired level. The device is provided with means for monitoring the power supply to the electrically operated forced ventilation system of the poultry house to sense any power failure and to effect opening of the curtains in response to a power failure. Preferably, the device includes means for delaying opening of the curtains for a predetermined amount of time after the power failure to avoid opening the curtains during a momentary interruption or disturbance in the power supply. Temperature sensing means is also provided in the device for sensing the temperature within the house and for effecting opening of the curtains of the house if the temperature therein exceeds a predetermined level. The temperature sensing means operates independently of the power monitoring means and insures that the temperature within the house does not exceed a predetermined healthy level. The temperature sensing means is useful in houses not provided with forced ventilation as well as for insuring ventilation of mechanically ventilated houses in the event of a mechanical failure of the forced ventilation equipment, such as a broken fan belt or burned-out motor.

The curtains in most poultry or livestock houses are conventionally raised to a closed position through a system of cables and pulleys in association with one or more winches. The device of the present invention includes a stop mechanism cooperating with the winch and cable mechanism to immobilize the winch or winches for maintaining the curtains in a raised position and also includes means for releasing the stop mechanism to permit the winch or winches to freely unreel cable and allow the curtains to be lowered by their own weight to an open position. The device is provided with its own power source which is independent of the power supplying the electrically operated forced ventilation system and is thus adapted to operate during a power failure. Additionally, the device includes a signal means for indicating the opening of the curtains due to a power failure or high temperature in the house. The signal means is preferably located at a remote location from the house for signaling to the farmer that the curtains of the house have been opened.

Some of the objects and advantages of the invention having been stated, others will appear as the description proceeds when taken in connection with the accompanying drawings, in which FIG. 1 is a perspective view of a poultry house showing the curtains along the side walls thereof and the winch and cables associated therewith, and also showing the curtain control device of the present invention;

FIG. 2 is a side elevational view, with parts broken away, of a poultry house showing the curtains along the side walls thereof and the cables and pulleys associated therewith for raising the curtains;

FIG. 3 is a detailed fragmentary elevational view of the winch mechanism and of the curtain control device associated therewith;

Figure 4:
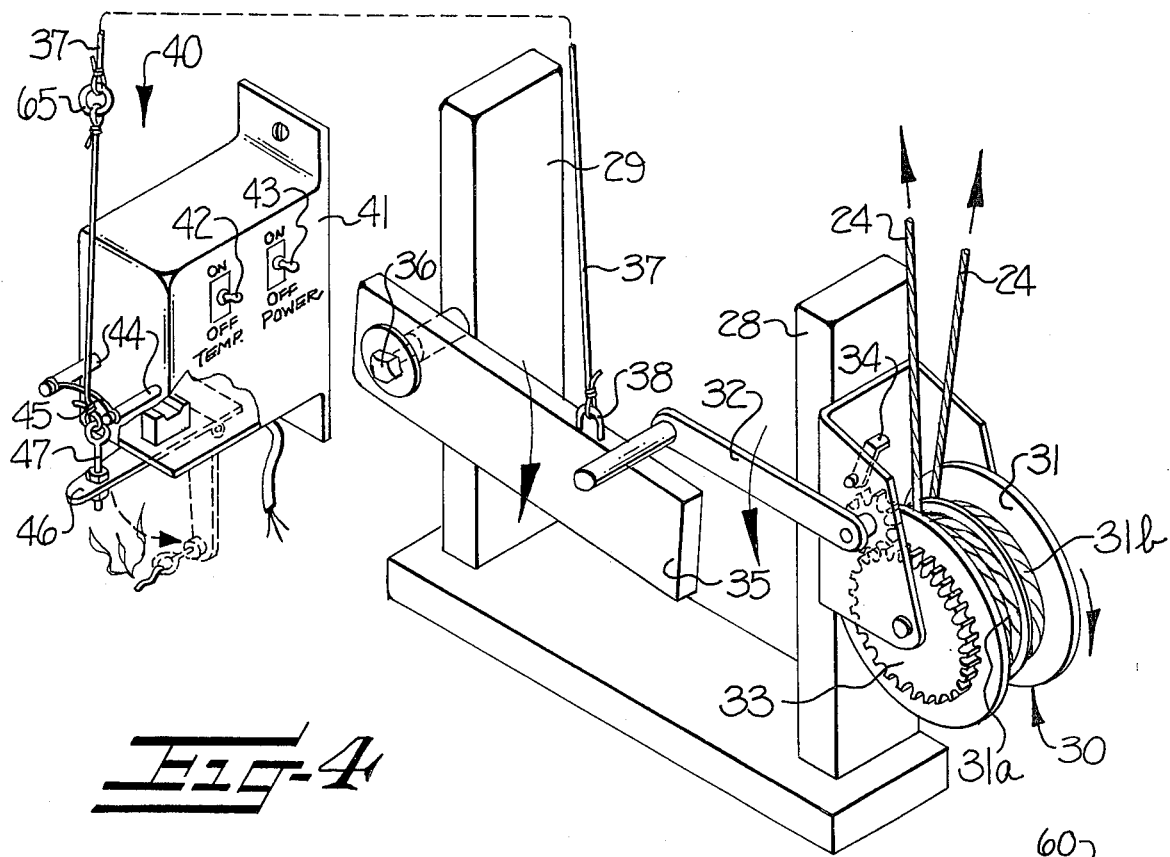
FIG. 4 is a somewhat schematic perspective view illustrating the operation of the winch mechanism and of the curtain control device associated therewith.

Referring now more specifically to the drawings, a poultry house of conventional construction is generally indicated in FIGS. 1 and 2 by the reference character 10, and includes end walls 11 and side walls 12 formed of any suitable siding material such as wood paneling or clapboard. Each of the side walls 12 includes upper and lower enclosed portions, 13, 14 respectively, extending throughout substantially the entire length of the poultry house, and inludes a medial open portion 15 located between the upper and lower enclosed portions 13, 14 and which is screened or covered by poultry wire or other suitable screening. The screened open portion 15 provides a large opening in the walls of the poultry house for ventilation.

A ventilating fan 16 is provided in the upper portion of end wall 11 of the poultry house and is adapted for providing forced ventilation in the poultry house by exhausting air from within the poultry house. A power line is indicated at 17 for supplying electrical power to the poultry house for lighting and for operating ventilating fan 16.

Curtains 20, made of suitable flexible air impervious material, are secured along the lower edge thereof by tacking or other suitable means to the upper edge 18 of the lower enclosed portion 14 of side wall 12. Cords 21 are connected to the upper edge 22 of the curtains and are adapted for raising the curtains to cover the screened open portion 15 of side wall 12 and to obstruct the flow of air therethrough. Preferably, a pocket is formed in the hem along the upper edge 22 of curtains 20 and a rod 22a (FIG. 2) is positioned therein for providing rigidity to the upper edge of the curtains. Cords 21 have one end thereof secured around the rod 22a at spaced locations along the length of the curtains and are arranged to pass over suitably positioned pulleys 23 mounted on the upper enclosed portion 13 of side wall 12. The opposite ends of cords 21 are connected to a cable 24 which extends substantially the entire length of the upper enclosed portion 13 of side wall 12. Cable 24 is maintained in position by pulleys 25, 26 positioned at opposite ends of the poultry house.

A winch 30 is positioned on end wall 11 of the poultry house and is adapted for reeling thereon one end of cable 24 from each side of the poultry house. The opposite end of cable 24 is weighted by a suitable weight 27 adapted to move up and down as cable 24 is reeled on winch 30. It will thus be appreciated that the curtains 20 on each side of the poultry house 10 are adopted for being raised or lowered to cover or uncover the screened open portion 15 of the poultry house by merely reeling in or letting out cable at winch 30. The curtains 20 will be lowered by their own weight to an open position when cable 24 is released from winch 30, and are maintained in a raised position covering the openings, or in any intermediate position therebetween, by locking or immobilizing winch 30.

Winch 30 is mounted on any suitable stationary support, such as the vertically extending frame member 28 illustrated which is mounted on the exterior of end wall 11. Winch 30 is provided with a drum 31 having two sections 31a, 31b for receiving and reeling cable 24 from each side of the poultry house and is also provided with a hand crank 32 which is operatively connected to drum 31 through a suitable gearing mechanism 33. A ratchet 34 is also provided and adapted for being engaged to facilitate reeling in the cable against the weight of curtains 20.

An interference bar 35 is provided adjacent winch 30 on the exterior of end wall 11 with one end thereof being pivotally mounted by a bolt 36 or other suitable means to a support such as vertically extending frame member 29, located adjacent one side of frame member 28. Interference bar 35 is pivotally rotatable from a horizontal position in which the free end thereof is located in the path of rotation of crank 32 of the winch to stop the unwinding of the winch, to downwardly extending angular position out of the path of rotation of crank 32. A cord 37 is secured to an eye 38 located adjacent the free end of interference bar 35 and is adapted for maintaining bar 35 raised in a horizontally extending position during normal operation of the poultry house so as to interfere with or obstruct the rotation of crank 32 of winch 30 and prevent lowering of the curtains. Ratchet 34 of winch 30 is normally disengaged so that crank 32 may freely rotate to permit lowering of curtains 20 when interference bar 35 is removed from the path of crank 32.

A control box, generally indicated at 40, is located on the exterior of end wall 11 to one side of winch 30 and interference bar 35, with cord 37 being directed by suitably positioned pulleys 39 to an eye bolt 47 on the lower side of control box 40. Control box 40 is provided with means for severing cord 37 during a power failure or when abnormally high temperatures exist within the poultry house to thereby permit interference bar 35 to swing downwardly out of the path of crank 32 and to allow the curtains of the poultry house to be lowered.

Control box 40 is provided with a housing 41 having a temperature switch 42 and power switch 43 provided thereon for controlling operation of the curtain control device as described in more detail later. A pair of insulating posts 44 extend outwardly from one side of housing 41 and a resistance wire 45 is connected therebetween. As illustrated in FIG. 4 cord 37 is positioned across resistance wire 45 and is secured to eye bolt 47 at the lower side of housing 41. Eye bolt 47 is carried by a hinge plate 46 pivotally secured to the underside of housing 41 and adapted to swing downwardly therefrom.

To effect lowering of the curtains of the poultry house, electric current is supplied to resistance wire 45 to thereby heat the same and effect severing of cord 37, which is of a thermoplastic or heat fusible material such as nylon, polypropylene, polyester, etc. Upon severing of cord 37, interference bar 35 swings downwardly as indicated by the arrows (FIG. 4), releasing crank 32 of winch 30 and permitting the same to rotate in the direction indicated by the arrow, thereby allowing cable 24 to be unreeled from drum 31. Also, hinge plate 46 swings downwardly to the position indicated in the dashed lines.

To facilitate resetting the device after it has been operated, and to avoid wasting cord, a ring 65 is provided in the cord 37 so that only the last foot of cord adjacent the resistance wire 45 must be replaced after severing.

Figure 5:
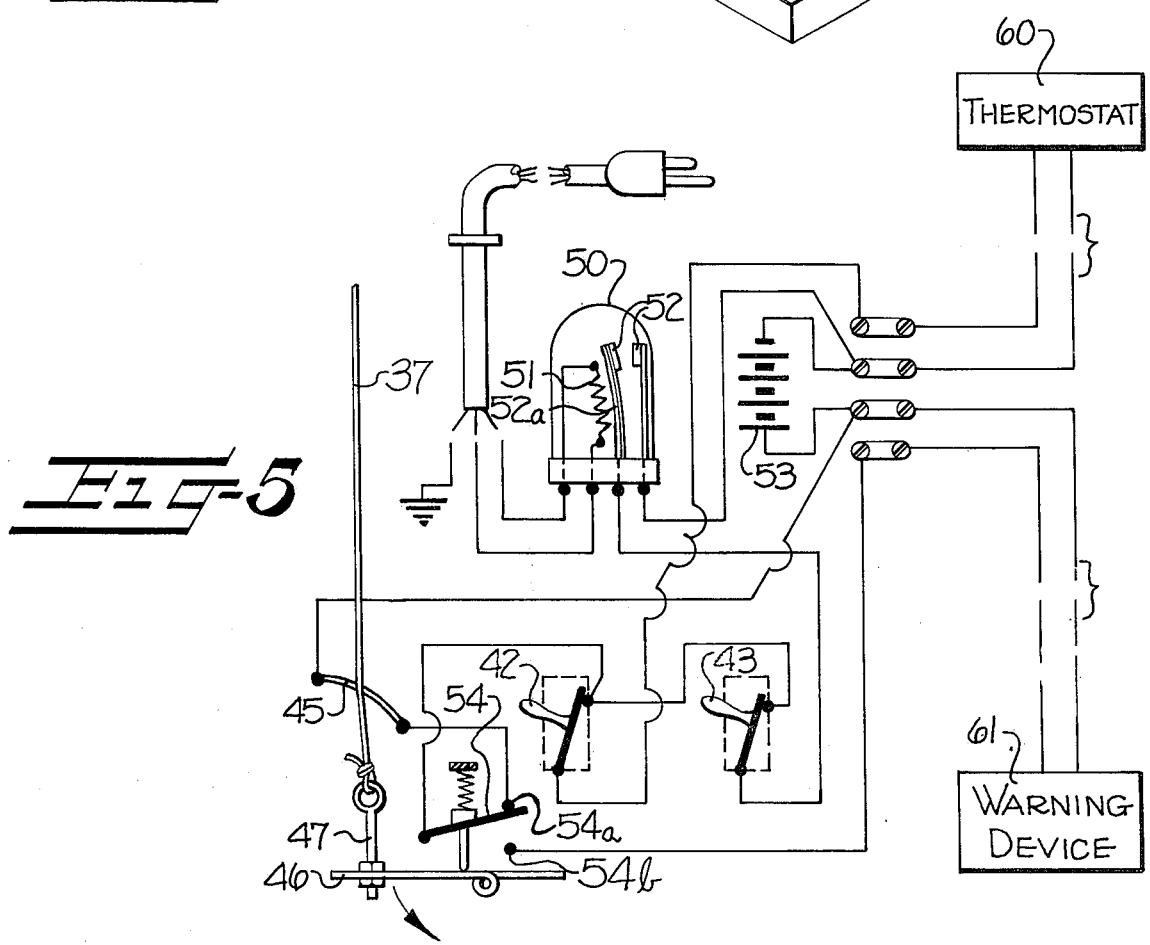
FIG. 5 is a schematic diagram of the electrical control system of the curtain control device.

As illustrated in FIG. 5, the control circuitry housed in housing 41 for controlling lowering of the curtains includes a relay 50 adapted for monitoring the electrical power being supplied to the ventilating system of the poultry house. Relay 50 is of a conventional type provided with a resistance heating coil 51 and with a pair of contacts 52, one of which is carried by a bimetallic element 52a. Contacts 52 are normally closed but adapted for being opened upon heating of bimetallic element 52a by heating coil 51. Contacts 52 will remain open so long as electrical current is supplied to the resistance heating coil 51 and will close after the coil and bimetallic element have sufficiently cooled, thereby effecting a time delay before closing the contacts. Relays of this type are conventionally available having any desired time delay characteristics. Preferably, relay 50 has a built-in time delay of about 3 minutes. As employed in the circuit illustrated, resistance heating coil 51 is wired to the conventional 115 volt power supply which operates the ventilating system of the poultry house so that contacts 52 of relay 50 will remain open so long as power is supplied to the ventilating system but will close a short time after failure of the power supply. This time delay prevents severing cord 37 and opening the curtains of the poultry house during a mere momentary interruption or failure in the power supply. It will be readily apparent that other means for effecting a time delay, such as a solid-state time delay device may be employed, if desired, in place of the relay 50 illustrated herein.

The curtain control device of the present invention is independently powered by its own self-contained power supply, which, as illustrated, is a battery 53 of conventional 6 or 12 volt dry or wet cell type. Battery 53 is wired to resistance wire 45 and is adapted for supplying power thereto for heating the wire and severing cord 37 upon the closing of contacts 52 of relay 50. A spring type microswitch 54, of the single-pole-double-throw type and being spring biased to remain in one position except when depressed, is provided adjacent hinge plate 46 on the lower side of housing 41 and is adapted for being depressed thereby so long as cord 37 is intact. Resistance wire 45 is wired through the normally open contact 54a of switch 54 so that when hinge plate 46 swings downwardly upon the severing of cord 37 and disengages microswitch 54, the circuit to resistance wire 45 is opened. Upon releasement of switch 54, the power from battery 53 is immediately diverted to an alarm or other suitable warning device 61, described below.

The curtain control device is also provided with a thermostat 60, which is located in the poultry house and is operatively connected to the control device and adapted for effecting lowering of the curtains upon a predetermined high temperature condition being sensed in the poultry house. Thermostat 60 is wired in parallel with relay 50 and is thereby adapted for operating independently of the power monitoring function of the device so that the curtains may be lowered upon either a power failure or upon a high temperature condition in the poultry house. It will be apparent that other sensing devices, such as a humidistat, may be employed instead of thermostat 60, if desired.

Temperature switch 42 and power switch 43 are provided in the respective temperature monitoring and power monitoring circuitry for controlling the operating functions of the device. The switches may be selected so that only the power monitoring function is in effect or may be selected so that only the temperature monitoring function is operative. Additionally, both switches may be selected so that the curtains will be released when either a high temperature condition or a power failure condition occurs. While the temperature monitoring means of the device is illustrated herein as receiving its power from battery 53, it will be apparent that any other available power source may be employed, if desired. Thus, in some instances, as for example when a possible power failure is not of concern, the temperature monitoring means of this device may be powered by the conventional 115 volt line voltage which is readily available in the poultry house.

An alarm or other suitable warning device 61 is wired to the normally closed contact 54b of switch 54 and is adapted for being activated only after cord 37 is severed to permit lowering of the curtains and after hinge 46 swings downwardly. The alarm, which may provide an audible and/or visual signal, is preferably located remotely of the poultry house for indicating that the control device has operated and that the curtains have been lowered.

Although the invention has been described with particular reference to a poultry house having forced ventilation means provided therein, it will be readily apparent that the device is suitable for use with other types of houses which do not have electrically operated forced ventilating means but which employ other types of electrical means for providing controlled ventilation of the house, or in houses which only employ manually operated winches for controlling opening or closing of the curtains of the house. For example, some poultry houses are provided with means for automatically raising or lowering the curtains in response to temperature variations in the poultry house. Such automatic curtain raising and lowering devices are not generally provided with a back-up power supply and are therefore rendered inoperative during a power failure. In the event that the power failure or malfunction of the device occurs when the curtains of the poultry house are in a raised position, overheating of the poultry house and possible suffocation of the poultry therein may occur. The present invention is particularly adapted for being employed in conjunction with such automatic curtain raising and lowering devices to serve as a safety device or "failsafe" mechanism for effecting lowering of the curtains upon a power failure or malfunction of the device.

In the drawings and specification, there has been set forth a preferred embodiment of the invention and although specific terms are employed, they are used in a generic and descriptive sense only and not for purposes of limitation.

That which is claimed is:

1. In a confinement house of the type used for raising poultry and livestock and having large ventilating openings in the side walls thereof, adjustable flexible curtains for opening and closing the ventilating openings, electrically operated forced ventilating means for providing controlled forced ventilation of the house, and power supply means operably connected to said electrically operated means, the combination therewith of means responsive to failure of said power supply means and operably connected to said curtains for opening the curtains for thereby insuring adequate lateral ventilation of the house and preventing suffocation of the poultry or livestock housed therein.

2. The combination of claim 1 wherein said means operably connected to said curtains also includes temperature sensing means operable for effecting opening of said curtains in response to sensing a predetermined high temperature in said house.

3. The combination of claim 2 wherein said means operably connected to said curtains includes signal means for indicating the opening of said curtains.

4. The combination of claim 3 wherein said signal means comprises audible signal means located remotely of said house.

5. The combination of claim 1 wherein said means operably connected to said curtains includes means for delaying opening of said curtains for a predetermined length of time after failure of said power supply means to thereby avoid opening said curtains in response to a momentary power failure.

6. The combination of claim 1 wherein said means operably connected to said curtains is powered by a power source independent of said power supply means.

7. In a confinement house of the type used for raising poultry and livestock and having large ventilating openings in the side walls thereof, large flexible curtains adapted for being adjustably positioned between a raised position covering said ventilating openings and a lowered position with said ventilating openings uncovered, electrically operated forced ventilating means for providing forced ventilation of the house, and power supply means operably connected to said electrically operated forced ventilating means, the combination therewith of means responsive to failure of said power supply means and operably connected to said flexible curtains for effecting lowering of said curtains to insure adequate lateral ventilation of the house and to thereby prevent suffocation of the poultry or livestock housed therein.

8. The combination of claim 7 wherein said means operably connected to said curtains includes mechanical means operably connected to said curtains for raising the curtains and maintaining the same in a raised position and control means cooperating with said mechanical means and adapted for releasing said mechanical means upon failure of said power supply means to permit said curtains to be lowered by their own weight to an open position.

9. The combination of claim 8 wherein said control means is powered by a power source independent of said power supply means.

10. The combination of claim 8 wherein said mechanical means comprises winch and cable means operably connected to said curtains and adapted for raising said curtains from a lowered position to a raised position and stop means cooperating with said winch and cable means for immobilizing the same and for maintaining said curtains in raised position, and wherein said control means includes means for releasing said stop means to permit said curtains to be lowered by gravity to an open position.

11. In a confinement house of the type used for raising poultry and livestock and having large ventilating openings in the side walls thereof, curtains adapted for being adjustably positioned between a raised position covering said ventilating openings and a lowered position with said ventilating openings uncovered, electrically operated forced ventilating means for providing forced ventilation of the house, and power supply means operably connected to said electrically operated forced ventilating means, the combination therewith of mechanical means operably connected to said curtains for raising the curtains and maintaining the same in a raised position and control means responsive to failure of said power supply means and also responsive to a predetermined high temperature condition being attained within said house and cooperating with said mechanical means for effecting releasement of said curtains to permit the same to be lowered by their own weight to an open position for thereby insuring adequate ventilation of the house and for preventing suffocation of the poultry or livestock housed therein.

12. The combination of claim 11 wherein said control means includes means for delaying releasement of said curtains for a predetermined length of time after failure of said power supply means to thereby avoid opening said curtains in response to a momentary power failure.

13. In a confinement house of the type used for raising poultry and livestock and having large ventilating openings in the side walls thereof and large flexible curtains adapted for being positioned between a raised position covering said large ventilating openings and a lowered position with said ventilating openings uncovered, the combination therewith of mechanical means operably connected to said flexible curtains for raising the curtains and maintaining the same in a raised position and control means responsive to a predetermined high temperature condition being attained within said house and cooperating with said mechanical means for effecting releasement of said curtains and the lowering of the curtains by their own weight to an open position for thereby insuring adequate ventilation of the house and for preventing suffocation of the poultry or livestock housed therein.

14. The combination of claim 13 wherein said mechanical means comprises winch and cable means operably connected to said curtains and adapted for raising said curtains from a lowered position to a raised position and stop means cooperating with said winch and cable means for immobilizing the same and for maintaining said curtains in raised position, and wherein said control means includes means for releasing said stop means to allow free movement of said winch and cable means and to thereby permit said curtains to be lowered by their own weight to an open position.

15. In a confinement house of the type used for raising poultry and livestock and having large ventilating openings in the side walls thereof, curtains adapted for being adjustably positioned between a raised position covering said ventilating openings and a lowered position with said ventilating openings uncovered, electrically operated forced ventilating means for providing forced ventilation of the house, and power supply means operably connected to said electrically operated forced ventilating means, the combination therewith of means responsive to failure of said power supply means and operably connected to said curtains for effecting lowering of said curtains to insure adequate ventilation of the house and to thereby prevent suffocation of the poultry or livestock housed therein, said means responsive to failure of said power supply means comprising cable means operably connected to said curtains, winch means associated with said cable means for permitting raising said curtains from a lowered position to a raised position, stop means adapted for immobilizing said winch means and maintaining said curtains in said raised position, said stop means including interference means cooperating with said winch means and being movable between a first position normally out of engagement with said winch means and a second position engaging said winch means and preventing unreeling of said cable means therefrom, said stop means also including a heat fusible strand operably connected to said interference means for maintaining said interference means in said second position engaging said winch means, heating means positioned in engagement with said heat fusible strand and being adapted for heating said strand to sever the same, and means for activating said heating means in response to failure of said power supply means for severing said heat fusible strand and permitting said winch means to freely unreel said cable means therefrom and thereby permitting said curtains to be lowered by their own weight to an open position.

16. In a confinement house of the type used for raising poultry and livestock and having large ventilating openings in the side walls thereof, and curtains adapted for being adjustably positioned between a raised position covering said ventilating openings and a lowered position with said ventilating openings uncovered, the combination therewith of means responsive to a predetermined high temperature condition being attained within said house and operably connected to said curtains for effecting lowering of said curtains to insure adequate ventilation of the house and to thereby prevent suffocation of the poultry or livestock housed therein, said means responsive to a predetermined high temperature condition comprising cable means operably connected to said curtains, winch means associated with said cable means for permitting raising said curtains from a lowered position to a raised position, stop means adapted for immobilizing said winch means and maintaining said curtains in said raised position, said stop means including interference means cooperating with said winch means and being movable between a first position normally out of engagement with said winch means and a second position engaging said winch means and preventing unreeling of said cable means therefrom, said stop means also including a heat fusible strand operably connected to said interference means for maintaining said interference means in said second position engaging said winch means, heating means positioned in engagement with said heat fusible strand, self-contained power supply means associated with said heating means and adapted for effecting heating of the same to sever said strand, and temperature sensing means cooperating with said heating means for activating the same in response to sensing a predetermined high temperature condition in said house for thereby severing said heat fusible strand and permitting said winch means to freely unreel said cable means therefrom and thereby permitting said curtains to be lowered by their own weight to an open position.

\* \* \* \* \*

UNITED STATES PATENT AND TRADEMARK OFFICE
CERTIFICATE OF CORRECTION

PATENT NO. : 3,915,377
DATED : October 28, 1975
INVENTOR(S) : James Alton Sutton, Jr.

It is certified that error appears in the above-identified patent and that said Letters Patent are hereby corrected as shown below:

Column 1, Line 29, delete the second occurrence of "for";
Column 3, Line 19, "pulleys" should be --pulley--; Line 33, change "adopted" to --adapted--; Column 5, Line 62, after "hinge" insert --plate--; Column 6, Line 43, "lateral" should be --natural--;
Column 7, Line 12, "lateral" should be --natural--.

Signed and Sealed this

Thirty-first Day of August 1976

[SEAL]

Attest:

RUTH C. MASON
*Attesting Officer*

C. MARSHALL DANN
*Commissioner of Patents and Trademarks*